United States Patent
Chung et al.

(10) Patent No.: US 7,299,669 B1
(45) Date of Patent: Nov. 27, 2007

(54) STEERING COLUMN LOCKING DEVICE HAVING PUSH RELEASE FUNCTION

(75) Inventors: Jin-Sang Chung, Suwon-si (KR); Sung-Ook Choi, Asan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/635,884

(22) Filed: Dec. 7, 2006

(30) Foreign Application Priority Data

Oct. 10, 2006 (KR) .................. 10-2006-0098322

(51) Int. Cl.
 *B60R 25/02* (2006.01)
(52) U.S. Cl. ......................... 70/252; 70/186
(58) Field of Classification Search .......... 70/182–186, 70/252
See application file for complete search history.

(56) References Cited

U.S. PATENT DOCUMENTS

| | | | |
|---|---|---|---|
| 4,972,692 A * | 11/1990 | Morikawa et al. ............. | 70/186 |
| 6,003,349 A | 12/1999 | Nagae et al. | |
| 6,260,651 B1 * | 7/2001 | Kokubu et al. ............. | 180/287 |
| 6,327,882 B1 * | 12/2001 | Canard ........................ | 70/186 |
| 6,508,088 B1 * | 1/2003 | Barbier et al. ................ | 70/186 |
| 6,718,805 B2 * | 4/2004 | Okuno ......................... | 70/186 |
| 6,779,371 B1 * | 8/2004 | Pieper ......................... | 70/186 |
| 6,810,701 B2 * | 11/2004 | Lee et al. ..................... | 70/186 |
| 6,826,934 B2 | 12/2004 | Canard | |
| 6,880,374 B2 * | 4/2005 | Yukihara et al. .............. | 70/186 |
| 6,941,779 B2 * | 9/2005 | Shigeyama et al. ........... | 70/186 |

FOREIGN PATENT DOCUMENTS

| | | |
|---|---|---|
| JP | 2005-335430 | 12/2005 |
| KR | 2006-0029445 | 6/2006 |

\* cited by examiner

*Primary Examiner*—Suzanne Dino Barrett
(74) *Attorney, Agent, or Firm*—Morgan Lewis & Bockius LLP

(57) ABSTRACT

A steering column locking device has an electromagnetic key interlock function that operates a solenoid to prevents a key knob from being undesirably moved to a lock position, as well as a mechanical key interlock function to conduct the key interlock function even when the solenoid malfunctions. The device includes the key knob and a plunger coupled to the key knob, so that when a user manipulates the key knob to start the vehicle, the plunger both moves axially and rotates. A cam shaft is coupled to the plunger, and a return spring is provided between the plunger and the cam shaft to bias the plunger towards the key knob. A stroke restrictor restricts a stroke of the plunger in the axial direction, and a push release functioning mechanism mechanically prevents the plunger from rotating from an accessory position to a lock position when the key interlock function fails.

8 Claims, 5 Drawing Sheets

STEERING COLUMN LOCKING DEVICE HAVING PUSH RELEASE FUNCTION

CROSS-REFERENCE TO RELATED APPLICATIONS

The present application is based on, and claims priority from, Korean Application Serial Number 10-2006-0098322, filed on Oct. 10, 2006, the disclosure of which is hereby incorporated by reference herein in its entirety.

FIELD OF THE INVENTION

The present invention relates to steering column locking devices having push release functions and, more particularly, to a steering column locking device with a mechanical key interlock function that can respond to the malfunction of an electromagnetic key interlock operation due to the malfunction of a solenoid.

BACKGROUND OF THE INVENTION

Generally, steering column locking devices using smart keys have key knob rotation restricting functions and key interlock functions.

The key knob rotation restricting function is conducted through the following process. After a wireless certification process for an available key or an ID card is completed, a control unit operates a solenoid to allow rotation of the key knob such that an engine can be started. When the key knob is moved to a lock position to turn off the engine, the control unit operates the solenoid to restrict the rotation of the key knob such that the steering column enters a locked state.

The key interlock function is conducted through the following process. In the state in which the wireless certification is completed and the engine is started, if a gear shift lever is not in a parking range, the key knob is prevented from moving to the lock position through the operation of the solenoid. Once the gear shift lever enters the parking range, the key knob is allowed to enter the lock position.

However, the conventional steering column locking device having the above-mentioned structure has a problem in that, if a malfunction of the solenoid occurs, the key knob cannot be prevented from entering the lock position even when the vehicle is moving. Furthermore, when the vehicle travels at a high speed, if the key knob is undesirably moved to the lock position, and the steering column thus enters a locked state in which it is impossible to steer the vehicle, a very dangerous condition may be caused.

Furthermore, the conventional steering column locking device must receive information about the gear shift lever in order to conduct the key interlock function. Therefore, in automatic vehicles, because it is possible to determine whether the gear shift lever is in a parking range using a parking range detecting switch, the key interlock function can be used. However, because a manual vehicle is provided with no separate means for detecting the parking range, the key interlock function cannot be used.

In manual vehicles, the key knob is generally prevented from undesirably moving to the lock position when the vehicle is moving using information about the speed of the vehicle. However, only when the key knob is in an ignition ON state, can the information about the speed of the vehicle be used. Therefore, if the key knob is in an accessory position, no information about the speed of the vehicle is obtained. Thus, the key interlock function cannot be conducted.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a steering column locking device which has a mechanical key interlock function using a push release manipulation as well as an electromagnetic key interlock function that prevents a key knob from moving to a lock position through the operation of a solenoid when the vehicle is moving, thus making it possible to conduct the key interlock function even when a malfunction of the solenoid occurs.

A steering column locking device using a smart key and having a key knob rotation restricting function and a key interlock function according to an embodiment of the present invention includes a key knob, user-operable to start the vehicle. A plunger is coupled to the key knob in such a way that when the key knob is turned to the start position, the plunger both moves in an axial direction and rotates in a circumferential direction. A housing is provided at a stationary position and has the plunger therein. A cam shaft is coupled to the plunger. A return spring is provided between the plunger and the cam shaft to elastically support the plunger such that the plunger is biased towards the key knob. A stroke restrictor restricts the stroke of the plunger when the plunger moves in the axial direction with respect to the housing. A push release functioning mechanism mechanically prevents the plunger from rotating from an accessory position to a locking position when the key interlock function fails.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, a preferred embodiment of the present invention will be described in detail with reference to the attached drawings.

Figure 1:
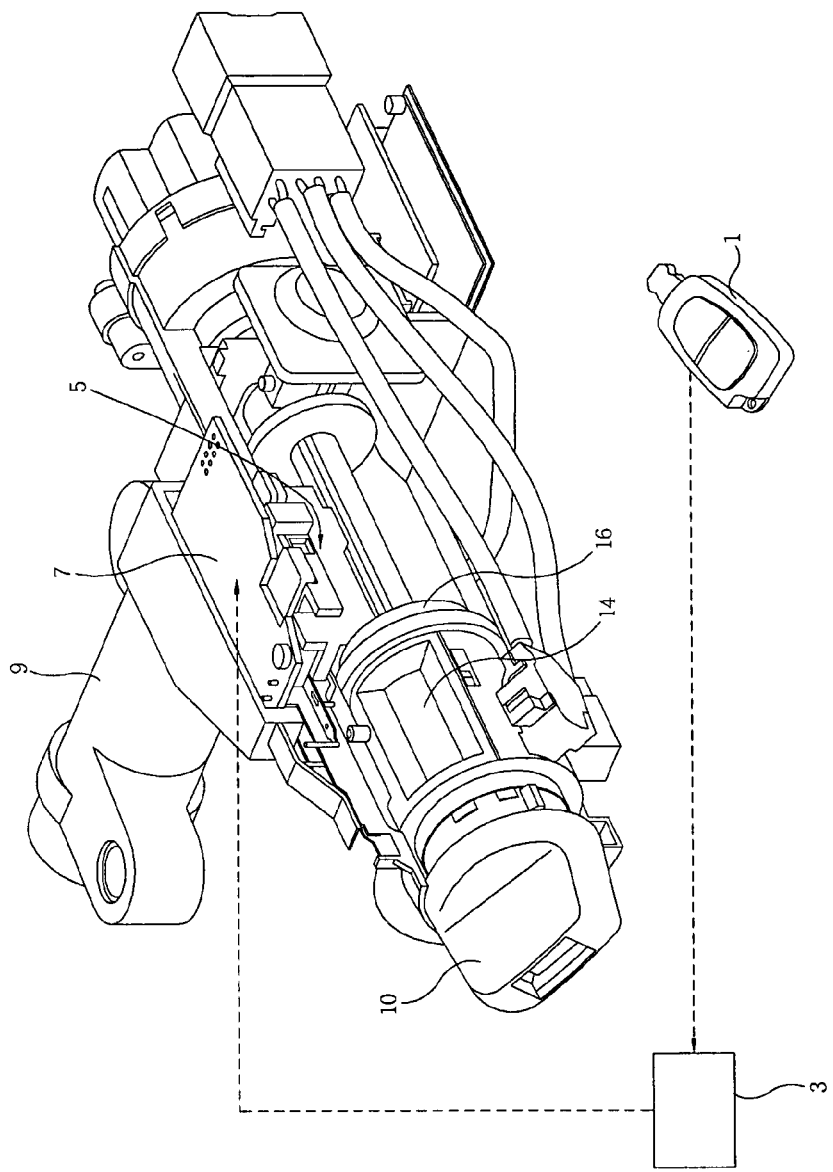
FIG. 1 is a perspective, partially schematic view of a steering column locking device using a smart key, according to an embodiment of the present invention.

As shown in FIG. 1, a steering column locking device using a smart key according to the embodiment of the present invention includes a control unit 3, which conducts a wireless certification process for an available key 1 or an ID card (not shown), a solenoid 5, which operates in response to a signal output from the control unit 3, and a cam shaft 16, which allows or interrupts the rotation of a plunger 12 (FIG. 2) coupled to a key knob 10 depending on the operation of the solenoid 5. The steering column locking device further includes a controller 7, which outputs an operating command to the solenoid 5 under the control of the control unit 3; and a body 9, which has a lock bar (not shown) that prevents rotation of the steering column when the engine enters an ignition off state.

The key knob 10 is rotated as a starting manipulation by a driver. The plunger 12 is coupled to the key knob 10 such that when the key knob 10 is rotated, the plunger 12 moves in an axial direction and rotates in a circumferential direction. The plunger 12 is placed in a hollow housing 14, such that the plunger 12 is movable in the axial direction and rotatable in the circumferential direction within the housing 14.

In addition, in the cam shaft 16, a key knob rotation preventing function and a key interlock function are conducted in response to the operation of the solenoid 5. The operation of cam shaft 16 and solenoid 5 may be substantially the same as in either of U.S. Pat. No. 7,009,479, "Steering Column Lock for Personal Identification Card System," issued on Mar. 7, 2006, or co-pending U.S. application Ser. No. 11/591,771, "Key Interlock Device for Steering Column Device," filed Nov. 2, 2006, both assigned to the assignee of the present invention, both of which are herein incorporated by reference in their entirety.

A first return spring 18 is further provided between the plunger 12 and the cam shaft 16 to elastically support the plunger 12, so that the plunger 12 is biased towards the key knob 10 in the housing 14.

A stroke restrictor is further provided between the plunger 12 and the housing 14. The stroke restrictor includes a first depression 20 and a stopper 22. The first depression 20 is provided on the outer surface of the plunger 12, and includes a first stop part 20a, which restricts a first stroke of an axially advancing movement of the plunger 12 with respect to the housing 14, a second stop part 20b, which restricts a second stroke of the plunger 12 that is conducted after the first stroke has been completed, and a third stop part 20c, disposed opposite the first and second stop parts 20a and 20b to restrict an axially returning movement of the plunger 12.

The stopper 22 is fastened at a first end thereof to the housing 14. A second end of the stopper 22 is placed in the first depression 20, so that, when the plunger 12 moves in a direction towards or away from the housing 14, the stopper 22 comes into contact with the first, second or third stop part 20a, 20b or 20c.

In addition, an inclined surface 20d is provided between the first stop part 20a and the second stop part 20b, such that the plunger 12 can easily move between the first and second stop parts 20a and 20b without the stop parts interfering with the stopper 22.

The circumferential position of the first stop part 20a corresponds to a lock position. The circumferential position of the second stop part 20b corresponds to an accessory position. The third stop part 20c is opposite the first and second stop parts 20a and 20b over a relatively larger circumferential section corresponding to the lock position, the accessory position, an ON position, and a start position.

A push release functioning mechanism is further provided between the plunger 12 and the housing 14. The push release functioning mechanism includes a second depression 24 and a catcher 28. The second depression 24 is provided on the outer surface of the plunger 12 and includes a fourth stop part 24a, which is inclined with respect to the axial direction of the plunger 12 to restrict the rotation of the plunger 12 with respect to the housing 14.

The catcher 28 is elastically supported at a first end thereof by a second return spring 26 so as to be movable in an axial direction of the housing 14. A second end of the catcher 28 extends into the second depression 24.

In detail, the first end of the catcher 28 is provided in the housing 14 so as to be movable in an axial direction, and the second end of the catcher 28 is bent in a radial direction of the housing 14 and protrudes towards the surface of the plunger 12.

Furthermore, a guide space 14a is provided in the housing 14 to guide the axial movement of the catcher 28. A stop part 14b, which is brought into contact with a contact protrusion 28a provided on the catcher 28, is provided in the guide space 14a to restrict the axial movement of the catcher 28.

As well, a fifth stop part 24b is provided in the second depression 24 to restrict the movement of the catcher 28 in the axial direction of the plunger 12.

The operation of the steering column locking device having the push release function according to the present invention will be described herein below.

Figure 2:
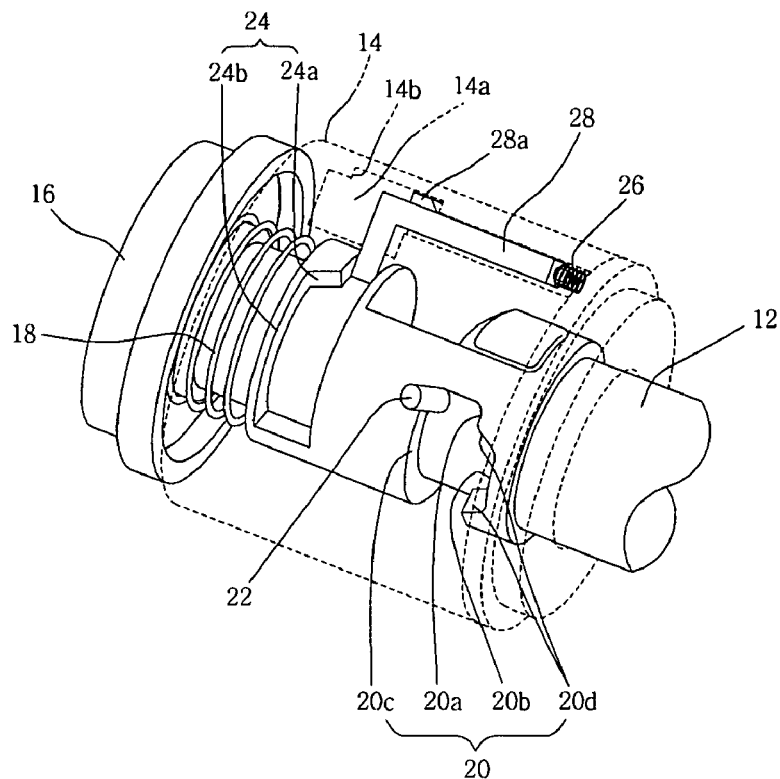
FIG. 2 is a perspective view of the construction of a push release functioning mechanism according to an embodiment of the present invention.

First, FIG. 2 shows the state of the steering column locking device when the key knob 10 is in the lock position. In this state, the plunger 12 is retracted to a restoration position by the restoring force of the first return spring 18. The stopper 22 is in contact with the third stop part 20c of the first depression 20 and thus prevents the plunger 12 from further moving in an axial direction with respect to the housing 14.

Figure 3:
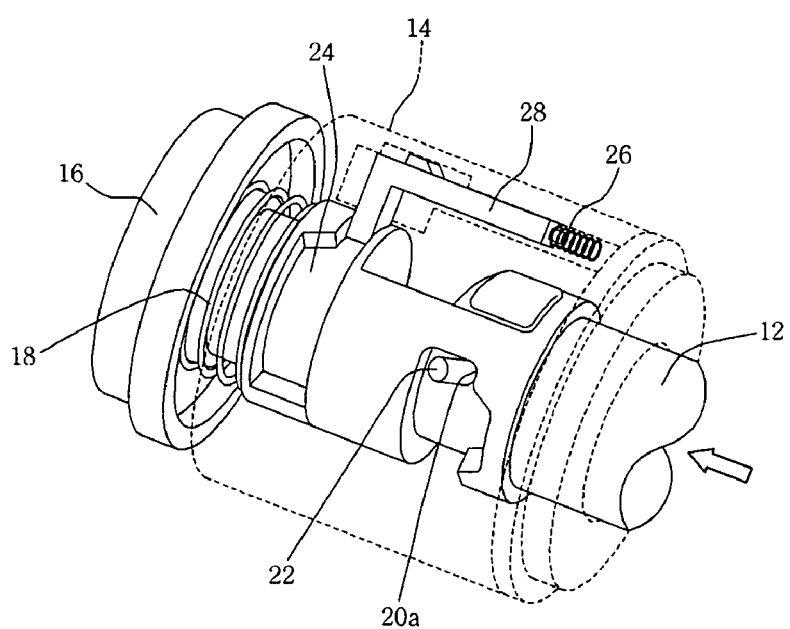
FIGS. 3 through 8 are perspective views of the operation of the push release functioning mechanism of FIG. 2.

Thereafter, as shown in FIG. 3, when the key knob 10 is pushed towards the housing 14, the first return spring 18 is compressed and the plunger 12 is axially advanced into the housing 14 by a first stroke. The stopper 22 is brought into contact with the first stop part 20a of the first depression 20.

Figure 4:
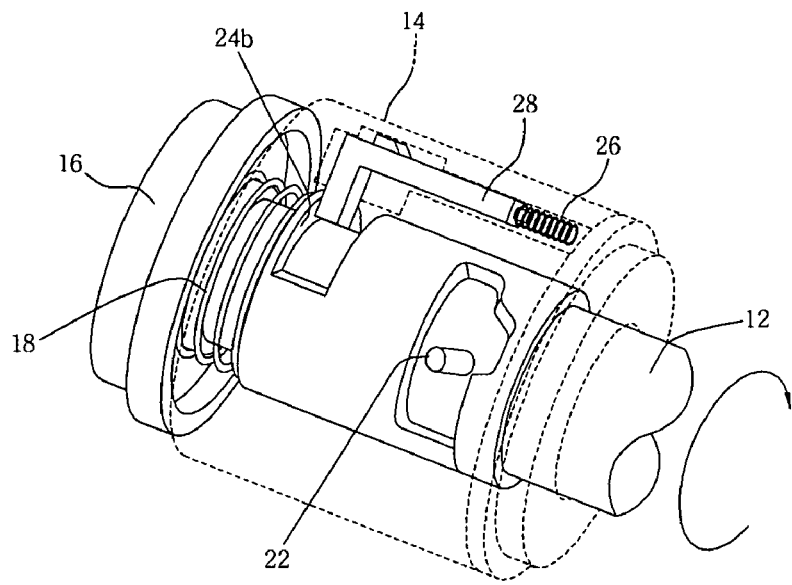

Subsequently, as shown in FIG. 4, when the key knob 10 is rotated in a clockwise direction from the lock position to the accessory position, the catcher 28 is advanced by the restoring force of the second return spring 26 and is brought into contact with the fifth stop part 24b via the fourth stop part 24a.

Figure 5:
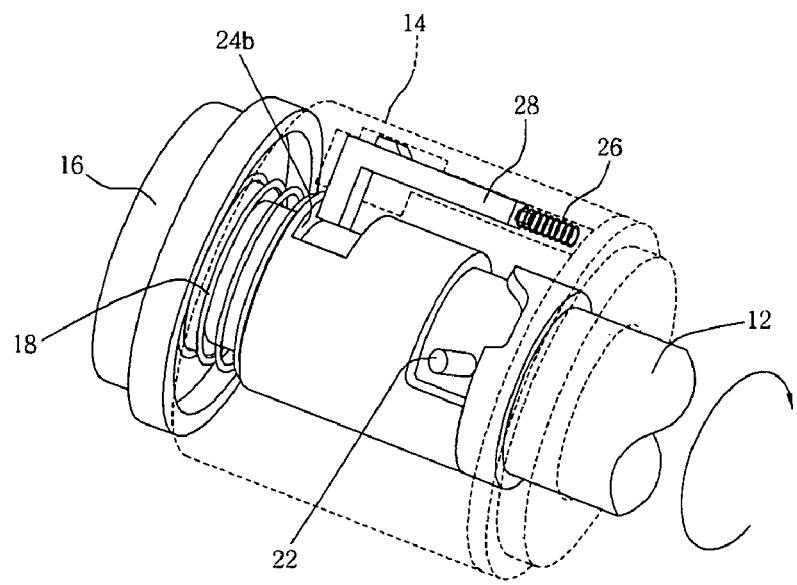
Figure 6:
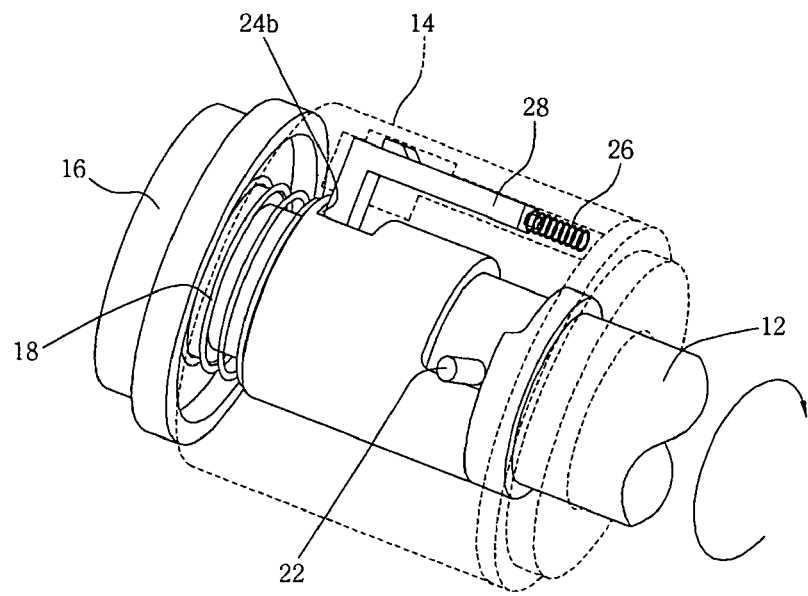

As shown in FIGS. 5 and 6, when the key knob 10 is further rotated in a clockwise direction, it reaches the start position of FIG. 6 via the ON position of FIG. 5. The catcher 28 remains in the advanced position, in contact with the fifth stop part 24b, by the restoring force of the second return spring 26.

Meanwhile, after the trip in the vehicle has been completed, when the key knob 10 is rotated in a counterclockwise direction to the accessory position, the steering column locking device enters the state of FIG. 4.

Figure 7:
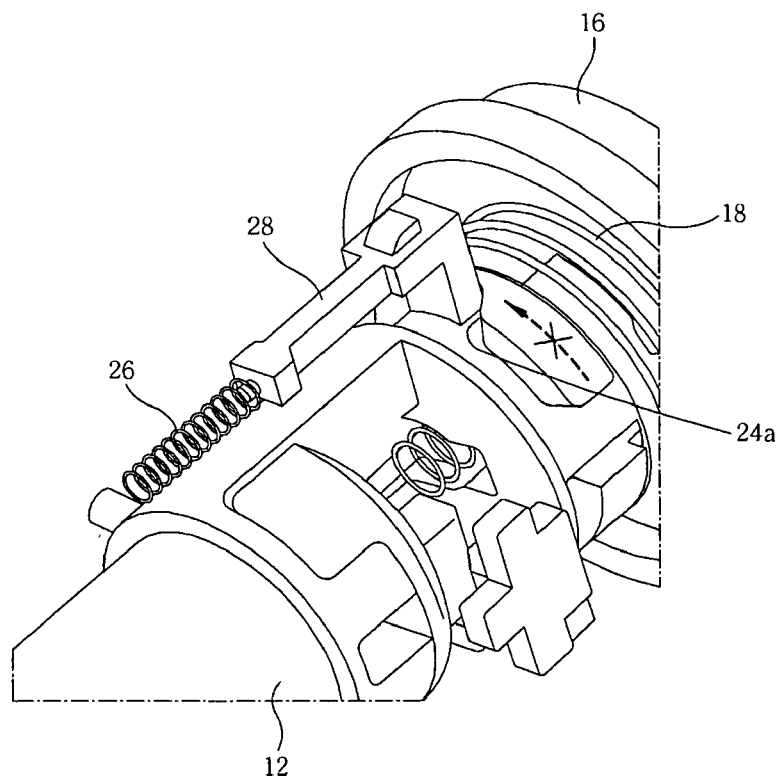

In this state, even if the key knob 10 is further rotated in a counterclockwise direction, because the catcher 28 is in contact with the fourth stop part 24a of the second depression 24, as shown in FIG. 7, the key knob 10 cannot be moved to the lock position.

The above-mentioned construction of the steering column locking device of the present invention provides a supplemental mechanical key interlock function for the case where a normal key interlock function cannot be conducted due to a malfunction of the solenoid 5.

In other words, the mechanical key interlock function prevents the key knob 10 from moving to the lock position during malfunction of the solenoid 5 when the vehicle is traveling at a high speed, thereby preventing the steering column from being undesirably locked.

Figure 8:
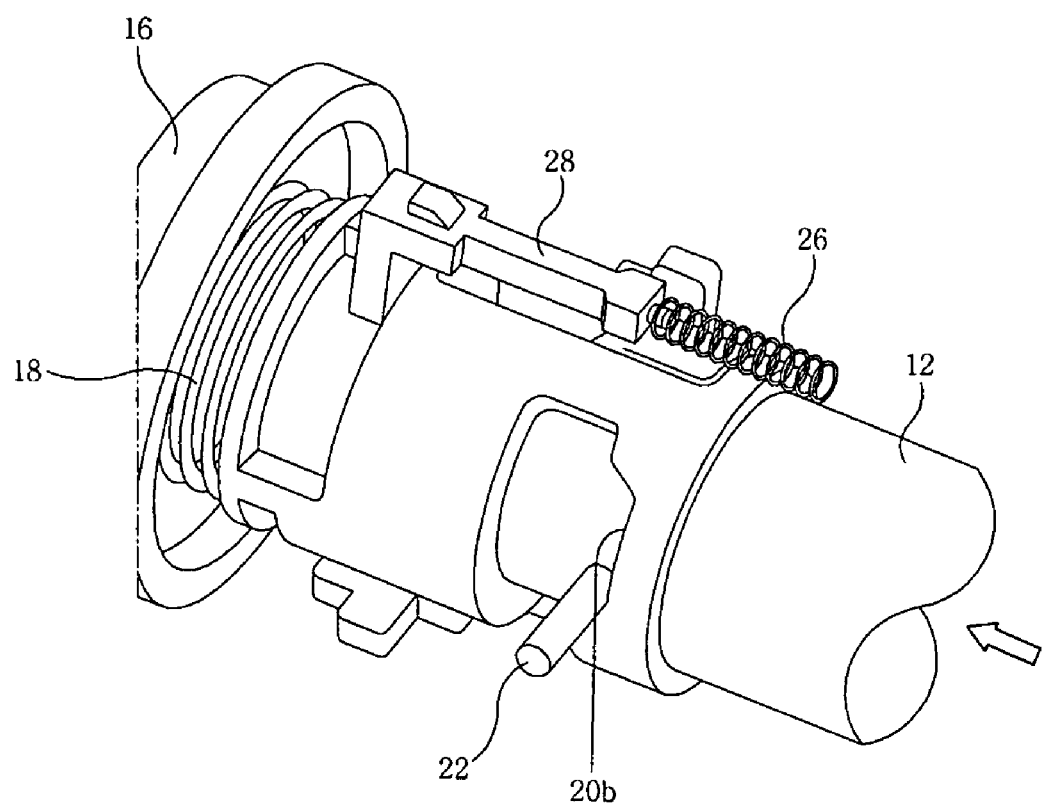

The mechanical key interlock function shown in FIG. 7 is removed by pushing the plunger 12 in the axial direction, as shown in FIG. 8, and then rotating the key knob 10 counterclockwise.

In detail, when the plunger 12 is pushed axially from the accessory position shown in FIG. 7 toward the lock position, the plunger 12 moves until the stopper 22 contacts the second stop part 20b. The catcher 28 remains stationary, and is freed from the fourth stop part 24a of the second depression 24, because a projecting portion 28a of the catcher 28 is hitched to the stop part 14b. In this state, the key knob 10 can be rotated in a counterclockwise direction to the normal lock position (see FIG. 2). The plunger 12 can easily be rotated without hitching to the stopper 22 via the inclined surface 20d. The catcher 28 compresses the second return spring 26 and returns to the state shown in FIG. 2, due to the axial movement of the plunger 12.

As is apparent from the foregoing, in a steering column locking device having a push release function according to the present invention, even if an electromagnetic key interlock function, which forcibly prevents a key knob from being switched to a lock position using a solenoid when the vehicle travels, cannot be conducted due to a malfunction of the solenoid, a mechanical key interlock function can be conducted in place of the electromagnetic method. Therefore, an emergency, in which the steering column is undesirably locked and it is thus impossible to steer the moving vehicle, is fundamentally prevented from occurring.

In some embodiments, the present invention includes both an electromagnetic key interlock function and the above-described mechanical key interlock function, thus having a fail-safe function.

Furthermore, the steering column locking device having the mechanical key interlock function according to the present invention can be used even in a vehicle having a manual transmission.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A steering column locking device using a smart key and having a key knob rotation restricting function and a key interlock function, comprising:
   a housing provided at a stationary position;
   a key knob that is user-operable for a starting manipulation, protruding from the housing;
   a plunger disposed in the housing and coupled to the key knob, so that, when the starting manipulation is conducted, the plunger moves in an axial direction and rotates in a circumferential direction;
   a cam shaft coupled to the plunger;
   a return spring provided between the plunger and the cam shaft to bias the plunger towards the key knob;
   a stroke restrictor that restricts movement of the plunger in the axial direction; and
   a push release functioning mechanism that mechanically prevents the plunger from being rotated from an accessory position to a lock position when the key interlock function fails.

2. The steering column locking device as defined in claim 1, wherein the stroke restrictor comprises:
   a first depression on a surface of the plunger, comprising a first stop part to restrict a first stroke of an axially advancing movement of the plunger, a second stop part to restrict a second stroke of the plunger which is conducted after the first stroke is completed, and a third stop part opposite the first and second stop parts to restrict an axially returning movement of the plunger; and
   a stopper fastened at a first end thereof to the housing, wherein a second end of the stopper is disposed in the first depression, so that, when the plunger is axially advanced or returned with respect to the housing, the stopper comes into contact with the first, second or third stop part.

3. The steering column locking device as defined in claim 2, wherein the first, second and third stop parts are formed in circumferential directions of the plunger.

4. The steering column locking device as defined in claim 3, further comprising an inclined surface between the first and second stop parts, such that the plunger smoothly rotates between the first and second stop parts.

5. The steering column locking device as defined in claim 2, wherein the first stop part is disposed in a section corresponding to a lock position, the second stop part is disposed in a section corresponding to an accessory position, and the third stop part is opposite the first and second stop parts in a relatively larger section corresponding to the lock position, the accessory position, an ON position and a start position.

6. The steering column locking device as defined in claim 1, wherein the push release functioning mechanism comprises:
   a second depression on a surface of the plunger, comprising a fourth stop part inclined with respect to the axial direction of the plunger to restrict rotation of the plunger; and
   a catcher elastically supported at a first end thereof by a second return spring and movable in the axial direction, wherein a second end of the catcher extends into the second depression.

7. The steering column locking device as defined in claim 6, wherein the first end of the catcher is disposed in the housing, and the second end of the catcher extends in a radial direction of the housing towards the surface of the plunger.

8. The steering column locking device as defined in claim 6, further comprising a fifth stop part in the second depression to restrict movement of the catcher in the axial direction.

* * * * *